United States Patent
Duluk, Jr. et al.

(10) Patent No.: US 9,710,306 B2
(45) Date of Patent: Jul. 18, 2017

(54) METHODS AND APPARATUS FOR AUTO-THROTTLING ENCAPSULATED COMPUTE TASKS

(75) Inventors: Jerome F. Duluk, Jr., Palo Alto, CA (US); Jesse David Hall, Santa Clara, CA (US); Philip Alexander Cuadra, San Francisco, CA (US); Karim M. Abdalla, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 611 days.

(21) Appl. No.: 13/442,730

(22) Filed: Apr. 9, 2012

(65) Prior Publication Data

US 2013/0268942 A1 Oct. 10, 2013

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5016* (2013.01); *G06F 2209/483* (2013.01)

(58) Field of Classification Search
None
See application file for complete search history.

(56) References Cited

U.S. PATENT DOCUMENTS 7,526,634 B1 * 4/2009 Duluk et al. ................. 712/216
7,747,842 B1 * 6/2010 Goudy et al. ................ 712/220
2004/0207630 A1 * 10/2004 Moreton et al. .............. 345/543
2006/0095807 A1 * 5/2006 Grochowski et al. ........ 713/324
2009/0007120 A1 * 1/2009 Fenger et al. ................ 718/102
2010/0131787 A1 * 5/2010 White et al. .................. 713/322
2011/0022857 A1 * 1/2011 Nussbaum et al. .......... 713/300
2011/0087860 A1 * 4/2011 Nickolls et al. ............... 712/22
2012/0096287 A1 * 4/2012 Kamath et al. .............. 713/300

OTHER PUBLICATIONS

Duane Merril, Michael Garland, Andrew Grimshaw; High Performance and Scalable GPU Graph Traversal; Aug. 2011; Technical Report CS-2011-05.*
Erik Lindholm, John Nicholls, Stuart Oberman, John Montrym; NVIDIA Tesla: A unified graphics and computing architecture; 2008 IEEE.*

* cited by examiner

*Primary Examiner* — Dong Kim
(74) *Attorney, Agent, or Firm* — Artegis Law Group, LLP

(57) ABSTRACT

Systems and methods for auto-throttling encapsulated compute tasks. A device driver may configure a parallel processor to execute compute tasks in a number of discrete throttled modes. The device driver may also allocate memory to a plurality of different processing units in a non-throttled mode. The device driver may also allocate memory to a subset of the plurality of processing units in each of the throttling modes. Data structures defined for each task include a flag that instructs the processing unit whether the task may be executed in the non-throttled mode or in the throttled mode. A work distribution unit monitors each of the tasks scheduled to run on the plurality of processing units and determines whether the processor should be configured to run in the throttled mode or in the non-throttled mode.

22 Claims, 10 Drawing Sheets

US 9,710,306 B2

METHODS AND APPARATUS FOR AUTO-THROTTLING ENCAPSULATED COMPUTE TASKS

BACKGROUND

Technical Field

The present disclosure generally relates to resource management, and more specifically to methods and apparatus for auto-throttling encapsulated compute tasks.

Description of the Related Art

In highly parallel processor architectures, such as the architectures of typical graphics processing units (GPUs), a software driver and/or a hardware resource manager is responsible for allocating various processor resources to each of a plurality of threads executing in parallel on the processor. For example, a driver may allocate a portion of memory to each of hundreds of concurrent threads executing on the processor. Every thread must be allocated a certain amount of local memory. In processors that are capable of executing hundreds or thousands of threads concurrently, the amount of physical memory required for the driver to allocate memory to every thread may become very large.

One limitation of conventional memory allocation techniques is that the amount of physical memory available to the processor limits the number of threads that can be executed concurrently by the processor. For example, each thread is allocated the same amount of local memory, the size of the allocated space being determined by the worst case requirement of all the threads. Another limitation of conventional memory allocation techniques is that memory is used inefficiently. Some threads may utilize a large percentage of their allocated memory while other threads only utilize a small portion of their allocated memory.

Accordingly, what is needed in the art is a system and method for auto-throttling encapsulated compute tasks for efficient memory allocation in parallel processors.

SUMMARY OF THE INVENTION

One example embodiment of the disclosure sets forth a method for auto-throttling encapsulated compute task. The method includes the steps of receiving one or more tasks to be scheduled for execution by a processor that includes a plurality of parallel processing units and determining whether at least one of the tasks scheduled for execution may be executed only when the processor is configured in the throttled mode. The processor may be configured in a non-throttled mode in which a first number of the plurality of parallel processing units are active for processing tasks or a throttled mode in which a second number of the plurality of parallel processing units are active for processing tasks, the second number being smaller than the first number. The method further includes the steps of, if none of the tasks require the processor to be configured in the throttled mode, then configuring the processor to activate the first number of parallel processing units, or, if at least one of the tasks require the processor to be configured in the throttled mode, then configuring the processor to activate the second number of parallel processing units.

Another example embodiment of the disclosure sets forth a processor including a plurality of parallel processing units and a work distribution unit configured to perform the steps set forth above. Yet another example embodiment of the disclosure sets forth a system including a memory and the processor.

One advantage of the disclosed approach is that shader local memory is not allocated dynamically based on changing requirements of the compute tasks scheduled to run. The device driver may pre-allocate the shader local memory for each of the discrete throttling modes. Therefore, when the mode of PPU 202 is changed, the shader local memory is already allocated and does not require any type of reallocation by the device driver.

BRIEF DESCRIPTION OF THE DRAWINGS

So that the manner in which the above recited features of the present disclosure can be understood in detail, a more particular description, briefly summarized above, may be had by reference to example embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skill in the art that the invention may be practiced without one or more of these specific details.

System Overview

Figure 1:
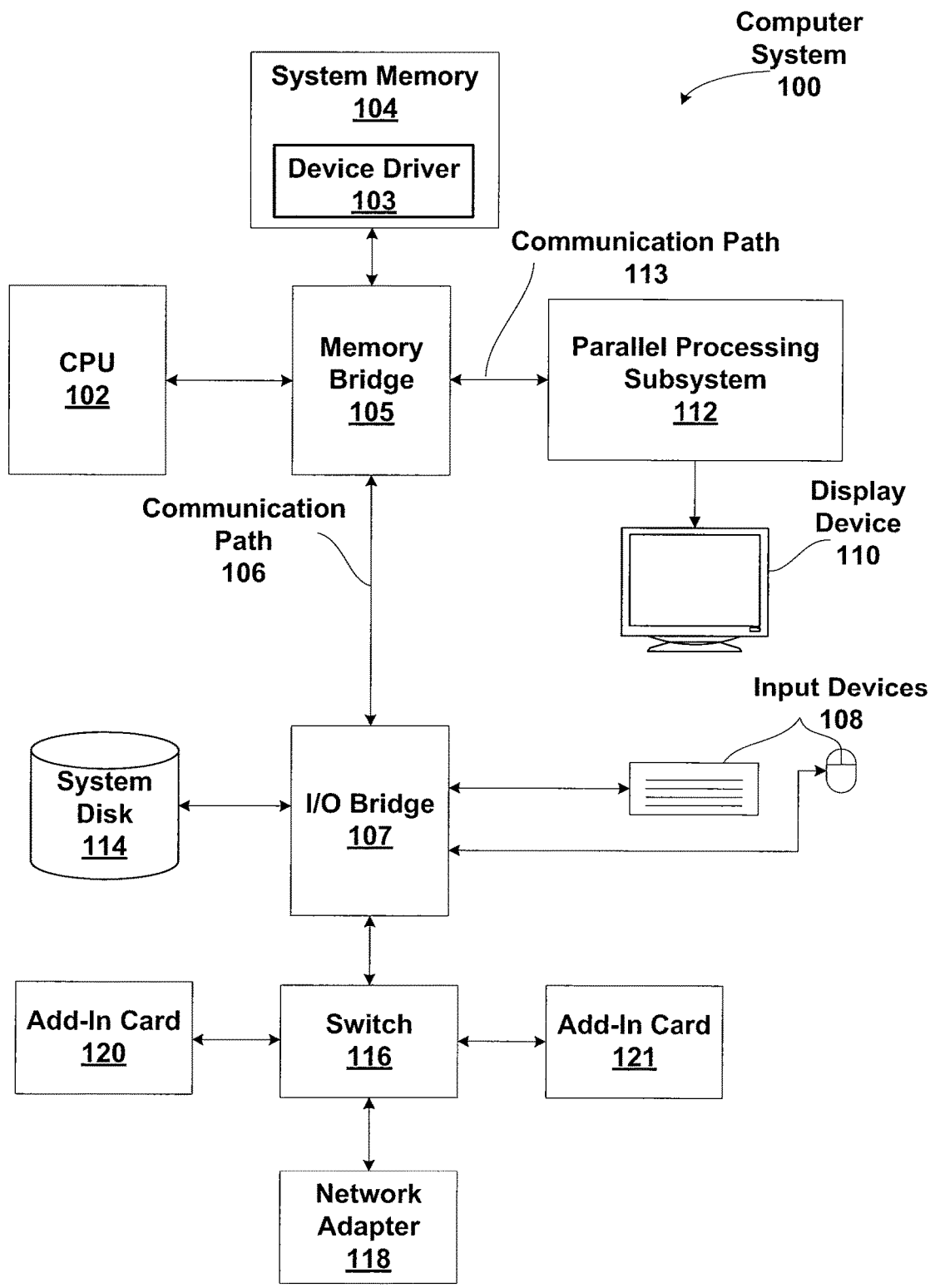
FIG. 1 is a block diagram illustrating a computer system configured to implement one or more aspects of the present disclosure.

FIG. 1 is a block diagram illustrating a computer system 100 configured to implement one or more aspects of the present disclosure. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect Express (PCIe), Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
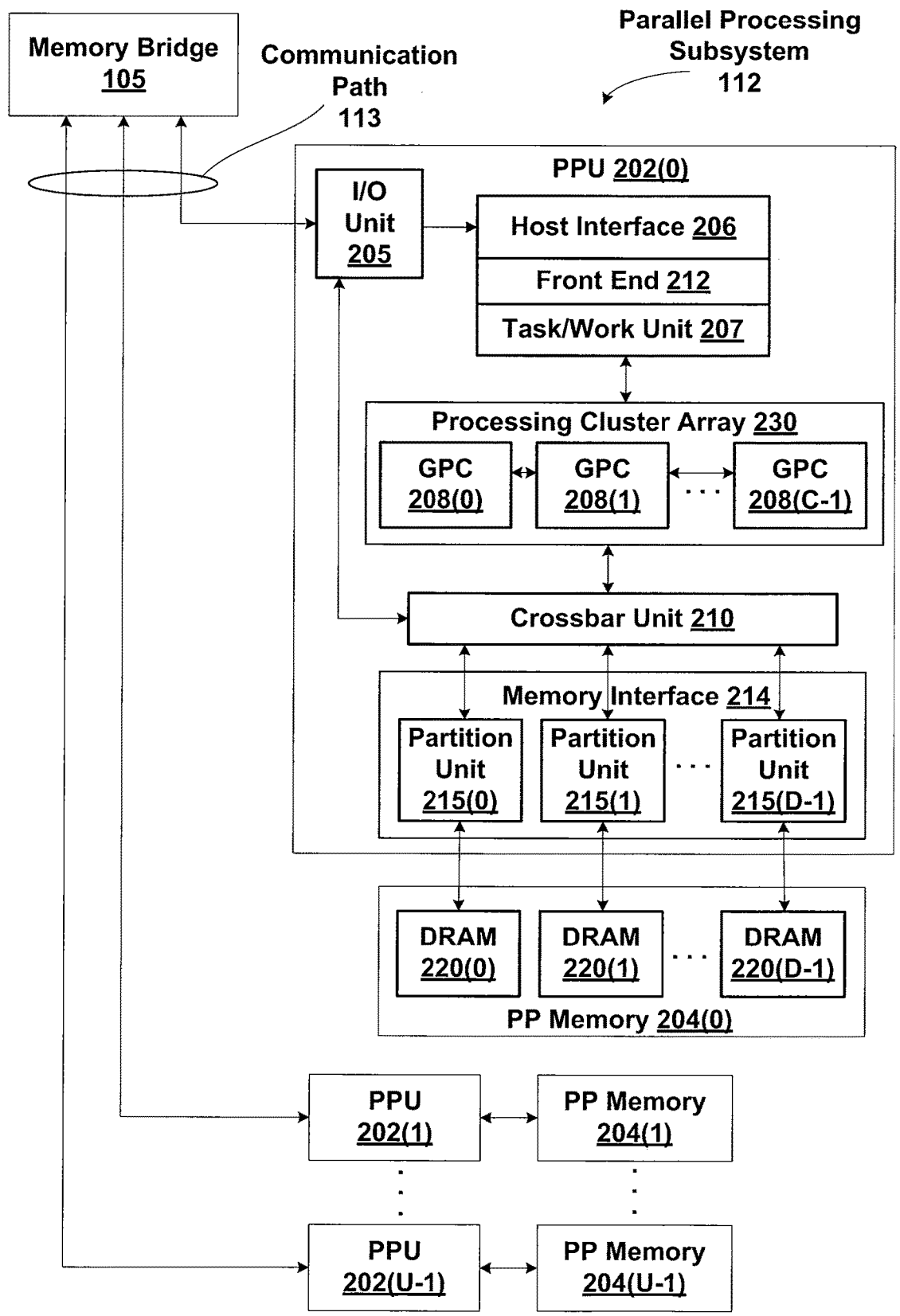
FIG. 2 is a block diagram of a parallel processing subsystem for the computer system of FIG. 1, according to one example embodiment of the present disclosure.

FIG. 2 illustrates a parallel processing subsystem 112, according to one example embodiment of the present disclosure. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
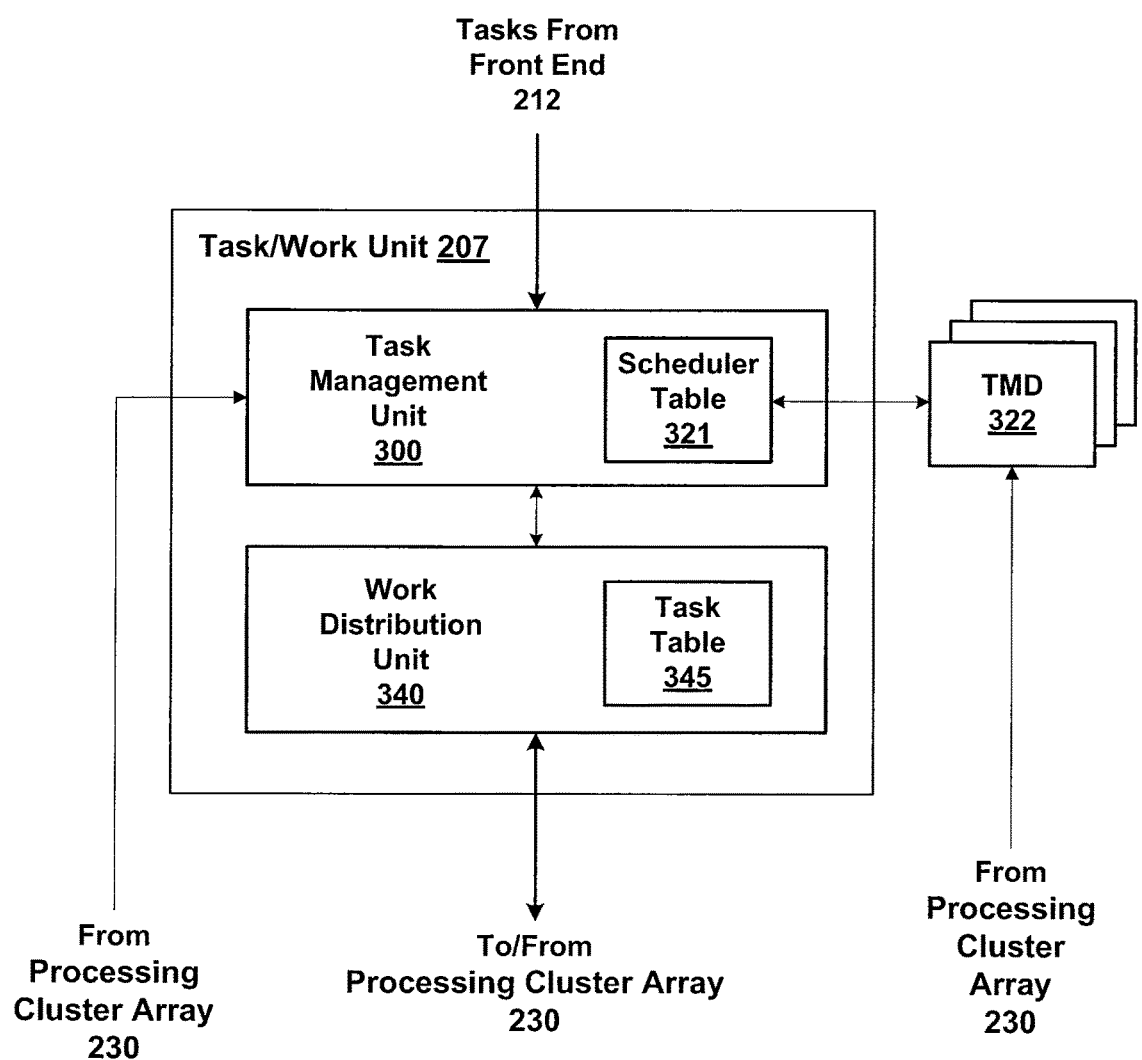
FIG. 3A is a block diagram of the front end of FIG. 2, according to one example embodiment of the present disclosure.

FIG. 3A is a block diagram of the task/work unit 207 of FIG. 2, according to one embodiment of the present disclosure. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
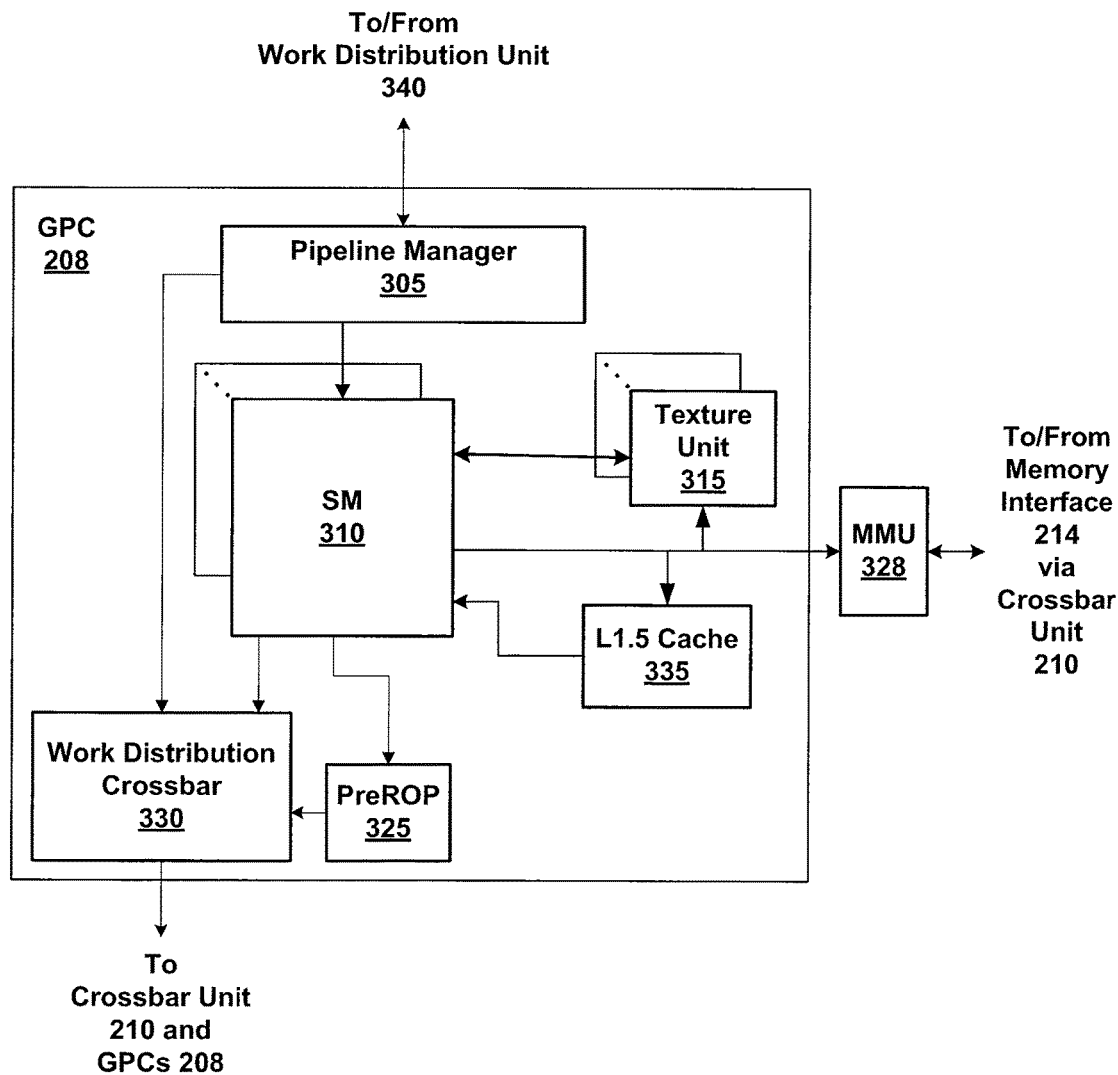
FIG. 3B is a block diagram of a general processing cluster within one of the parallel processing units of FIG. 2, according to one example embodiment of the present disclosure.

FIG. 3B is a block diagram of a GPC 208 within one of the PPUs 202 of FIG. 2, according to one example embodiment of the present disclosure. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
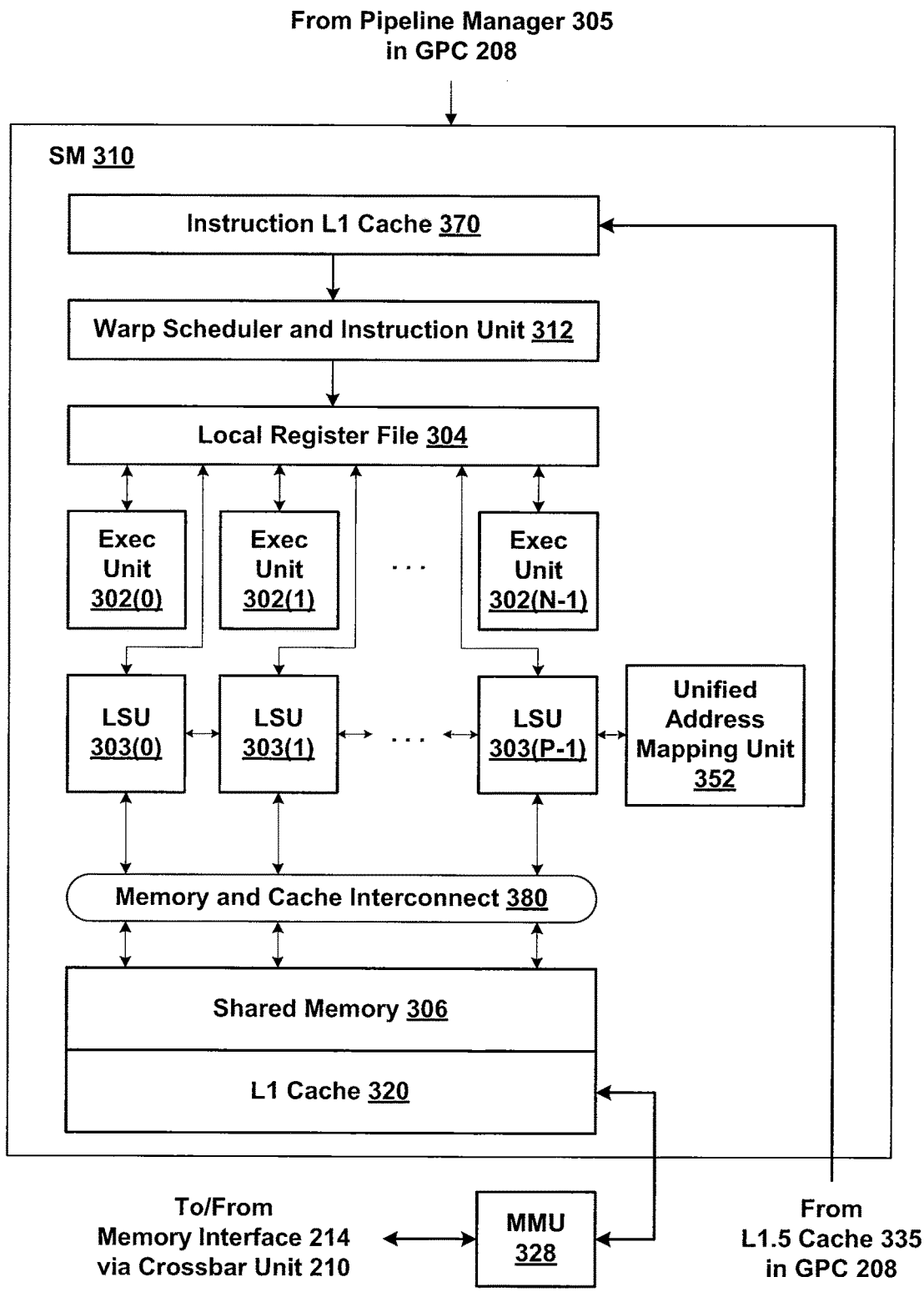
FIG. 3C is a block diagram of a portion of the streaming multiprocessor of FIG. 3B, according to one example embodiment of the present disclosure.

FIG. 3C is a block diagram of the SM 310 of FIG. 3B, according to one example embodiment of the present disclosure. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

The task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each entry in a linked list stores a task pointer to a TMD 322 in memory and a pointer to the next entry in the respective linked list. A head pointer and a tail pointer for the linked list are stored for each TMD group. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD 322 corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed. Compute tasks can also be received from the processing cluster array 230.

The collection of compute tasks into groups based on priority levels prior to scheduling the compute tasks allows for a decoupling of the rate at which compute tasks are received by the task management unit 300 from the rate at which compute tasks are output to the work distribution unit 340 for execution. The task management unit 300 is generally able to accept compute tasks from one or more push buffers output by the host interface 206 at a faster rate than the compute tasks may be output for execution by the work distribution unit 340. The input from the different push buffers are independent streams, typically generated by the same application program in order to have multiple sets of dependent tasks, but in some embodiments, multiple application programs can write to the pushbuffers. The task management unit 300 may be configured to buffer the compute tasks in the scheduler table 321 and later select one or more compute tasks from the scheduler table 321 for output to the work distribution unit 340. By selecting the compute tasks after they are buffered, the task management unit may make the selection based on more information compared with selecting a compute task as compute tasks are received. For example, the task management unit 300 may buffer several low-priority tasks that are received before a high-priority task. The buffering enables the task management unit 300 to select the high-priority task for output before the low-priority tasks.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the TMD group in which the selected compute task is stored. Regardless of the scheduling technique, the task management unit 300 is able to quickly select a compute task by selecting the first entry in the linked list of the appropriate group. The task management unit 300 may easily organize, and, if needed, reorder the compute tasks by simply changing the ordering of the task pointers in the linked lists of the TMD groups. Therefore, the compute tasks may be scheduled and/or executed in an order that is different than the order in which the task pointers are received by the task management unit 300 from the host interface 206.

The simplest scheduling scheme is for the task management unit 300 to schedule the compute task at the head of each group (if a compute task exists in the group) and rotate through the groups in round-robin order. Another scheduling technique is priority scheduling that selects the compute tasks in strict priority order. The task management unit 300 selects a compute task from the highest priority TMD group that has at least one compute task, starting at the head of the group.

Compute Task Encapsulation

Figure 4A:
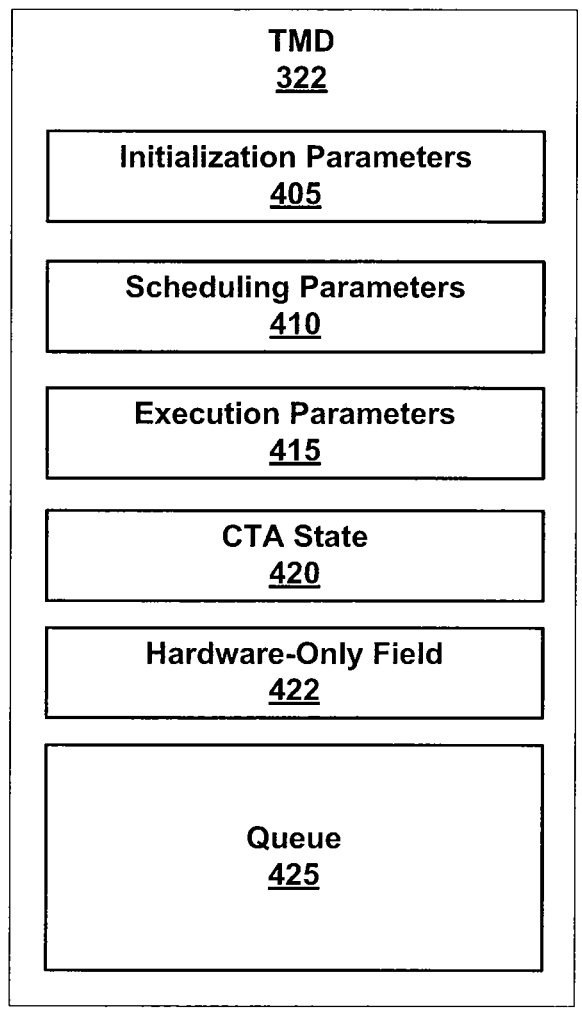
FIG. 4A is a conceptual diagram of the contents of a TMD 322 that is stored in PP memory 204, according to one example embodiment of the present disclosure.

FIG. 4A is a conceptual diagram of the contents of a TMD 322 that is stored in PP memory 204, according to one example embodiment of the present disclosure. The TMD 322 is configured to store initialization parameters 405, scheduling parameters 410, execution parameters 415, CTA state 420, a hardware-only field 422, and a queue 425. The hardware-only field 422 stores the hardware-only portion of the TMD 322, which comprises one or more hardware-only parameters. State that is common to all TMDs 322 is not included in each TMD 322. Because a TMD 322 is a data structure that is stored in PP memory 204, a compute program running on the CPU 102 or PPU 202 can create a TMD 322 structure in memory and then submit the TMD 322 for execution by sending a task pointer associated with the TMD 322 to the task/work unit 207.

The initialization parameters 405 are used to configure the GPCs 208 when the TMD 322 is launched and may include the starting program address and size of the queue 425. Note that the queue 425 may be stored separately from the TMD 322 in memory in which case the TMD 322 includes a pointer to the queue 425 (queue pointer) in place of the actual queue 425.

The initialization parameters 405 may also include bits to indicate whether various caches, e.g., a texture header cache, a texture sampler cache, a texture data cache, data cache, constant cache, and the like, are invalidated when the TMD 322 is launched. A bit indicating whether texture samplers are linked one-to-one with texture headers may also be included in the initialization parameters 405. Initialization parameters 405 may also include dimensions of a CTA in threads, a TMD version number, an instruction set version number, dimensions of a grid in terms of CTA width, height, and depth, memory bank mapping parameters, depth of a call stack as seen by an application program, and a size of the call-return stack for the TMD. The initialization parameters 405 may include a size of a constant buffer, an address of the constant buffer, a bit indicating that a constant buffer bind is valid, and a bit indicating that the data from the constant buffer is invalidated in the cache before the TMD is launched may be stored in the initialization parameters 405.

Finally, the initialization parameters 405 may include several parameters related to the amount of memory available for each thread of a CTA. When a TMD 322 needing multiple CTAs that each require large amounts of memory are ready to be scheduled for execution, the task/work unit 207 may limit (i.e., throttle) the number of CTAs that execute concurrently so the CTAs do not attempt to consume more memory than is available for access by the TMD 322. Examples of parameters related to the amount of memory available for each thread of a CTA include a size of one or more local memory regions, a number of registers, size of memory that may be directly addressed by the TMD 322 through an L1 cache, an amount of shared memory for a single CTA, and a number of barrier operations for each CTA.

The scheduling parameters 410 control how the task/work unit 207 schedules the TMD 322 for execution. The scheduling parameters 410 may include a bit indicating whether the TMD 322 is a queue TMD or a grid TMD. If the TMD 322 is a grid TMD, then the queue feature of the TMD 322 that allows for additional data to be queued after the TMD 322 is launched is unused, and execution of the TMD 322 causes a fixed number of CTAs to be launched and executed to process the fixed amount of data stored in the queue 425. The number of CTAs is specified as the product of the grid width, height, and depth. The queue 425 is replaced with a queue pointer to the data that will be processed by the CTAs executing the program specified by the TMD 322.

If the TMD 322 is a queue TMD, then the queue feature of the TMD 322 is used, meaning that data are stored in the queue 425, as queue entries. Queue entries are input data to CTAs of the TMD 322. The queue entries may also represent a child tasks that are generated by another TMD 322 during execution of a thread, thereby providing nested parallelism. Typically, execution of the thread, or CTA that includes the thread, is suspended until execution of the child task completes. The queue 425 may be implemented as a circular queue so that the total amount of data is not limited to the size of the queue 425. As previously described, the queue 425 may be stored separately from the TMD 322 and the TMD 322 may store a queue pointer to the queue 425. Advantageously, queue entries for the child task may be written to the queue 425 while the TMD 322 representing the child task is executing.

A variable number of CTAs are executed for a queue TMD, where the number of CTAs depends on the number of entries written to the queue 425 of the TMD queue. The scheduling parameters 410 for a queue TMD also include the number of entries (N) of queue 425 that are processed by each CTA. When N entries are added to the queue 425, one CTA is launched for the TMD 322. The task/work unit 207 may construct a directed graph of processes, where each process is a TMD 322 with a queue. The number of CTAs to be executed for each TMD 322 may be determined based on the value of N for each TMD 322 and the number of entries that have been written in the queue 425.

The scheduling parameters 410 of a queue TMD may also comprise a coalesce waiting time parameter that sets the amount of time that is waited before a CTA is run with less than N queue entries. The coalesce waiting time parameter is needed when the queue is almost empty, but an insufficient number of queue entries is present, which can arise when the total number of queue entries over the course of execution is not evenly divisible by N. The coalesce waiting time parameter is also needed for the case of producer-consumer queues, in order to avoid deadlock. For the case of a CTA being executed with fewer than N entries, the number of queue entries is passed as a parameter to the TMD's program, so that the number of entries can be taken into account during execution.

Alternate embodiments may have different structures for a grid TMD and a queue TMD, or implement only either grid TMDs or queue TMDs. The scheduling parameters 410 of the TMD 322 may include a bit indicating whether scheduling the dependent TMD also causes TMD fields to be copied to the hardware-only field 422. The scheduling parameters 410 may also include the TMD group ID, a bit to indicate where the TMD 322 is added to a linked list (head or tail), and a pointer to the next TMD 322 in the TMD group. The scheduling parameters 410 may also include masks that enable/disable specific streaming multiprocessors within the GPCs 208.

A TMD 322 may include a task pointer to a dependent TMD that is automatically launched when the TMD 322 completes. Semaphores may be executed by the TMDs 322 to ensure that dependencies between the different TMDs 322 and the CPU 102 are met. For example, the execution of a first TMD may depend on a second TMD completing, so the second TMD generates a semaphore release, and the first TMD executes after the corresponding semaphore acquire succeeds. In some embodiments, the semaphore acquire is performed in the host interface 206 or the front end 212. The execution parameters 415 for a TMD 322 may store a plurality of semaphore releases, including the type of memory barrier, address of the semaphore data structure in memory, size of the semaphore data structure, payload, and enable, type, and format of a reduction operation. The data structure of the semaphore may be stored in the execution parameters 415 or may be stored outside of the TMD 322.

The execution parameters 415 may also include the starting address of the program to be executed for the TMD 322, the type of memory barrier operation that is performed when execution of the TMD 322 completes, a serial execution flag indicating whether only a single CTA is executed at a time (serially) for the TMD 322, and a throttle enable flag that controls whether or not the task/work unit 207 may limit the number of CTAs running concurrently based on the memory limitations specified for the TMD 322.

The execution parameters 415 also store various flags that control behaviors of arithmetic operations performed by the processing task that is executed for the TMD 322, e.g., not-a-number (NaN) handling, float-to-integer conversion, and rounding modes of various instructions.

The CTA state 420 for the TMD 322 may include an ID of a reference counter used by the TMD 322, an enable for incrementing the reference counter, and a separate enable for decrementing the reference counter. When a process is preempted, processing of the TMD 322 may be stopped at an instruction boundary or a CTA boundary and identification of the CTA at which processing will be resumed is stored in the CTA state 420. The state information needed to resume execution of the TMD 322 after preemption may be stored in the CTA state 420, or in a separate area in PP memory 204, or in system memory 104.

The CTA state 420 also stores data pointers to entries of the queue 425 and counter overflow flags indicating when each data pointer increments past the end of the queue 425 and needs to wrap back to the start of the queue 425. Hardware-only versions of one or more of the data pointers and the scheduling flag may be stored in the hardware-only field 422.

Figure 4B:
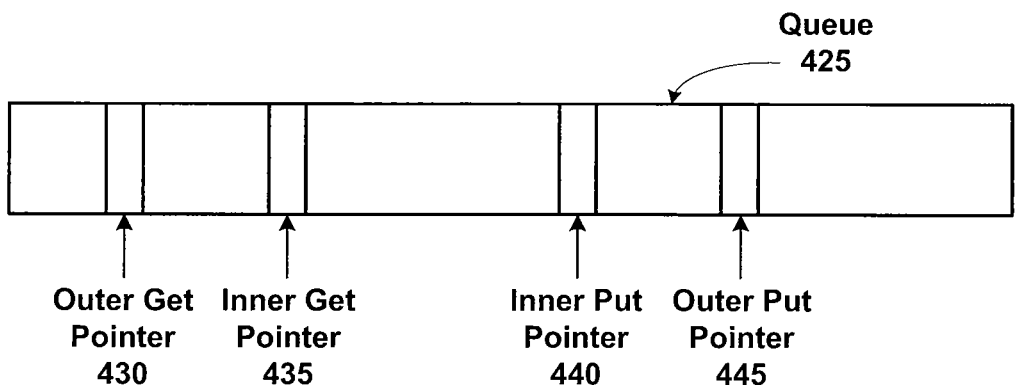
FIG. 4B illustrates data pointers to entries of the queue 425 of FIG. 4A, according to one example embodiment of the invention.

FIG. 4B illustrates data pointers to entries of the queue 425 of FIG. 4A, according to one example embodiment of the invention. Writing data for a processing task encoded in the queue 425 is decoupled from the allocation of entries in the queue 425. First a process reserves or allocates a number of entries in the queue 425 and later, the process stores the data to be processed by the CTAs in the entries. An outer put pointer 445 points to the next available entry in the queue 425 to be allocated and an inner put pointer 440 points to the oldest entry in the queue 425 that has been allocated and not yet written. The entries are not necessarily written in the order in which the entries are allocated, so there may be entries between the inner put pointer 440 and the outer put pointer 445 that have been written.

An outer get pointer 430 points to the oldest entry of the queue 425 that stores data that has been assigned to a CTA for processing, i.e., a CTA that will process the data has been launched but the CTA has not read the data yet. An inner get pointer 435 points to the newest entry of the queue 425 that has been assigned to a CTA for processing. Data that have been written to the queue 425, but not yet assigned to a CTA for processing are stored in the entries between the inner get pointer 435 and the inner put pointer 440. Data that have been assigned to a CTA for processing and not read are stored between the outer get pointer 430 and the inner get pointer 435.

Figure 5A:
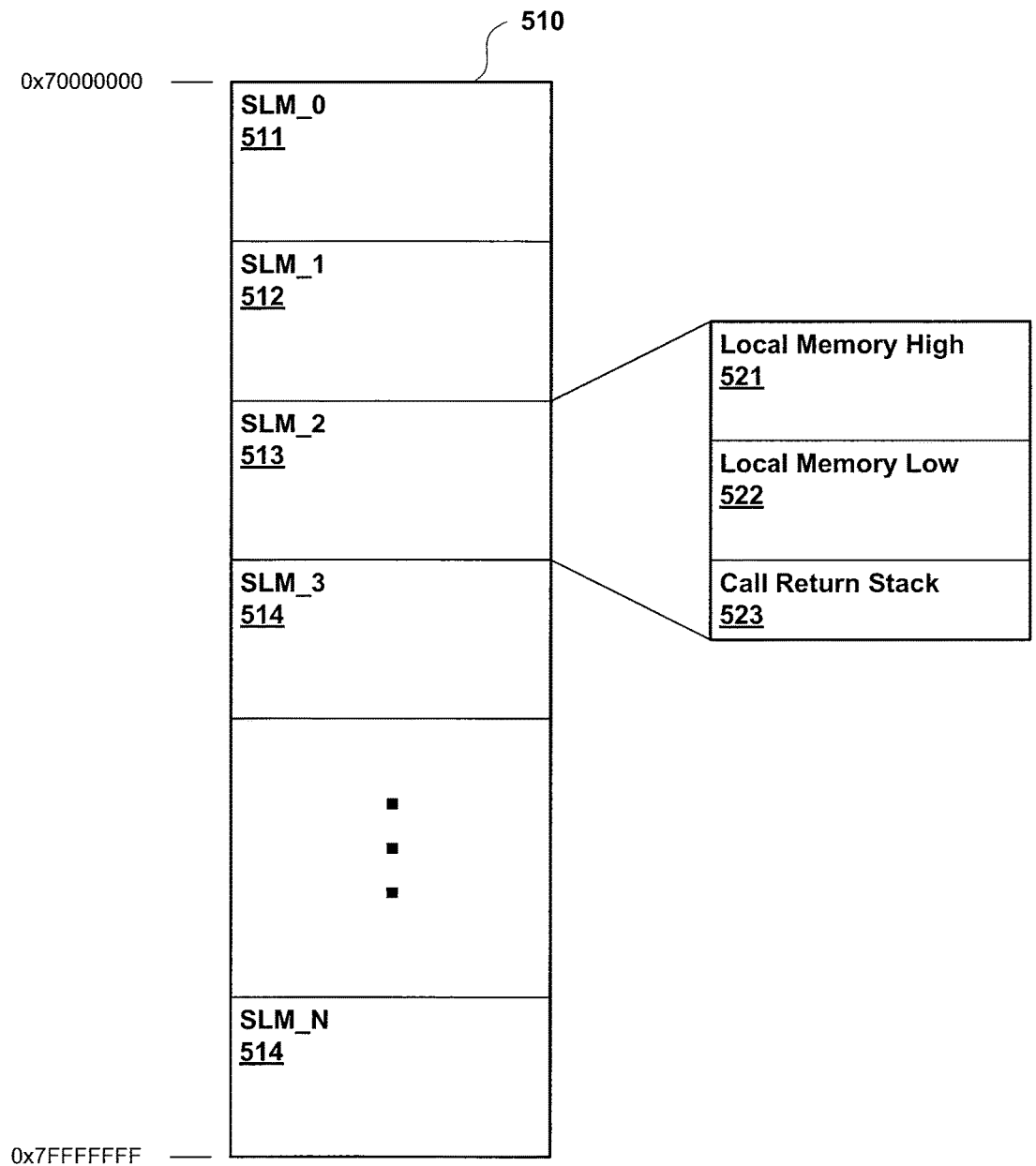
FIG. 5A illustrates a virtual address space 510 allocated by device driver 103 as shader local memory, according to one example embodiment of the present disclosure.

FIG. 5A illustrates a virtual address space 510 allocated by device driver 103 as shader local memory, according to one example embodiment of the present disclosure. Shader local memory is a per-thread private data storage stored in PP memory 204 and directly addressable by LSUs 303 via L1 cache 320. As shown in FIG. 5A, virtual address space 510 is an address space starting at an arbitrary base address such as 0x70000000. Although a base address of 0x70000000 was chosen for purposes of illustration, any other arbitrary base address may be used instead. In exemplary embodiments, the base address is aligned to a physical memory boundary to facilitate efficient memory accesses, meaning that the base address corresponds to the start of a memory row (or memory page) in PP memory 204. For example, in a system that implements 4 kB memory pages, the base address should map to a physical memory address within PP memory 204 that corresponds to a multiple of 4 kB. In one embodiment, virtual address space 510 is allocated by device driver 103 as 256 MB of contiguous virtual memory addresses, resulting in a total virtual address range of 0x70000000 to 0x7FFFFFFF given the arbitrarily assigned base address of 0x70000000. In one embodiment, the virtual address space 510 is implemented with 32-bit addresses, providing up to 4 GB of addressable virtual memory locations. In another embodiment, the virtual address space 510 is implemented with 64-bit addresses, providing up to 16 EB (Exabyte) of addressable virtual memory locations.

Device driver 103 is configured to allocate memory within the virtual address space 510 to threads scheduled to execute within PPU 202. Each SM 310 that is activated within PPU 202 is allocated a certain amount of shader local memory (511, 512, etc.). In one embodiment, each SM 310 is allocated the same amount of shader local memory, where the entire virtual address space 510 is divided equally between all of the active SMs 310. Task/work unit 207 may configure the number (N) of active SMs 310 enabled to process a particular TMD 322 within a GPC 208. The number N may be less than or equal to the total number of physical SMs 310 available in PPU 202. For example, PPU 202 may include 16 distinct SMs 310. If all 16 SMs 310 are active and shader local memory is 256 MB in size, then each of a first allocated shader local memory (SLM_0) 511, a second allocated shader local memory (SLM_1) 512, a third allocated shader local memory (SLM_2) 513, a fourth allocated shader local memory (SLM_3) 514, etc., is allocated 16 MB of storage within virtual address space 510. If only a subset of the physical SMs 310 are activated, such as 4 SMs 310, then each of the active SMs 310 is allocated a larger share of addresses within virtual address space 510.

In one embodiment, each allocated shader local memory (511, 512, etc.) includes three partitions divided between all of the threads scheduled on the corresponding SM 310—local memory high 521, local memory low 522, and a call return stack 523. The size of these partitions may be allocated by device driver 103 using a predetermined ratio based on the size of shader local memory allocated to each SM 310. Each TMD 322 scheduled on the SM 310 may require a different amount of thread-private memory depending on the particular programs specified by the CTAs within the TMD 322. Device driver 103 will store the maximum memory requirements for each thread in fields in the initialization parameters 405 of the TMD 322.

Local memory high 521 is a thread-private local memory for storing a data stack. The initialization parameters 405 include a field TMD.ShaderLocalMemoryHighSize that is specified in bytes/thread. The device driver 103 may allocate between 0 bytes and 512 kB of local memory high 521 to each thread of TMD 322, in increments of 16 bytes. Local memory low 522 is a thread-private local memory for variable storage. The initialization parameters 405 also include a field TMD.ShaderLocalMemoryLowSize that is specified in bytes/thread. The device driver 103 may allocate between 0 bytes and 512 kB of local memory low 522 to each thread of TMD 322, in increments of 16 bytes. In some embodiments, the sum of TMD.ShaderLocalMemoryHighSize and TMD.SHaderLocalMemoryLowSize can be limited to 512 kB. Call return stack 523 provides a program stack for the CTAs in TMD 322. The initialization parameters 405 also include a field TMD.ShaderLocalMemoryCrsSize that is specified in bytes/warp. The device driver 103 may allocate between 0 bytes and 1 MB of call return stack 523 to each thread of TMD 322, in increments of 512 bytes. Each 512 byte increment may store 32 stack entries, where each stack entry comprises 16 bytes. It will be appreciated that different size allocation units may be used in alternative embodiments. In some embodiments, a hardware resource manager (instead of the device driver 103) within the PPU 202 may be configured to allocate memory to each thread as tasks are received by the PPU 202.

Figure 5B:
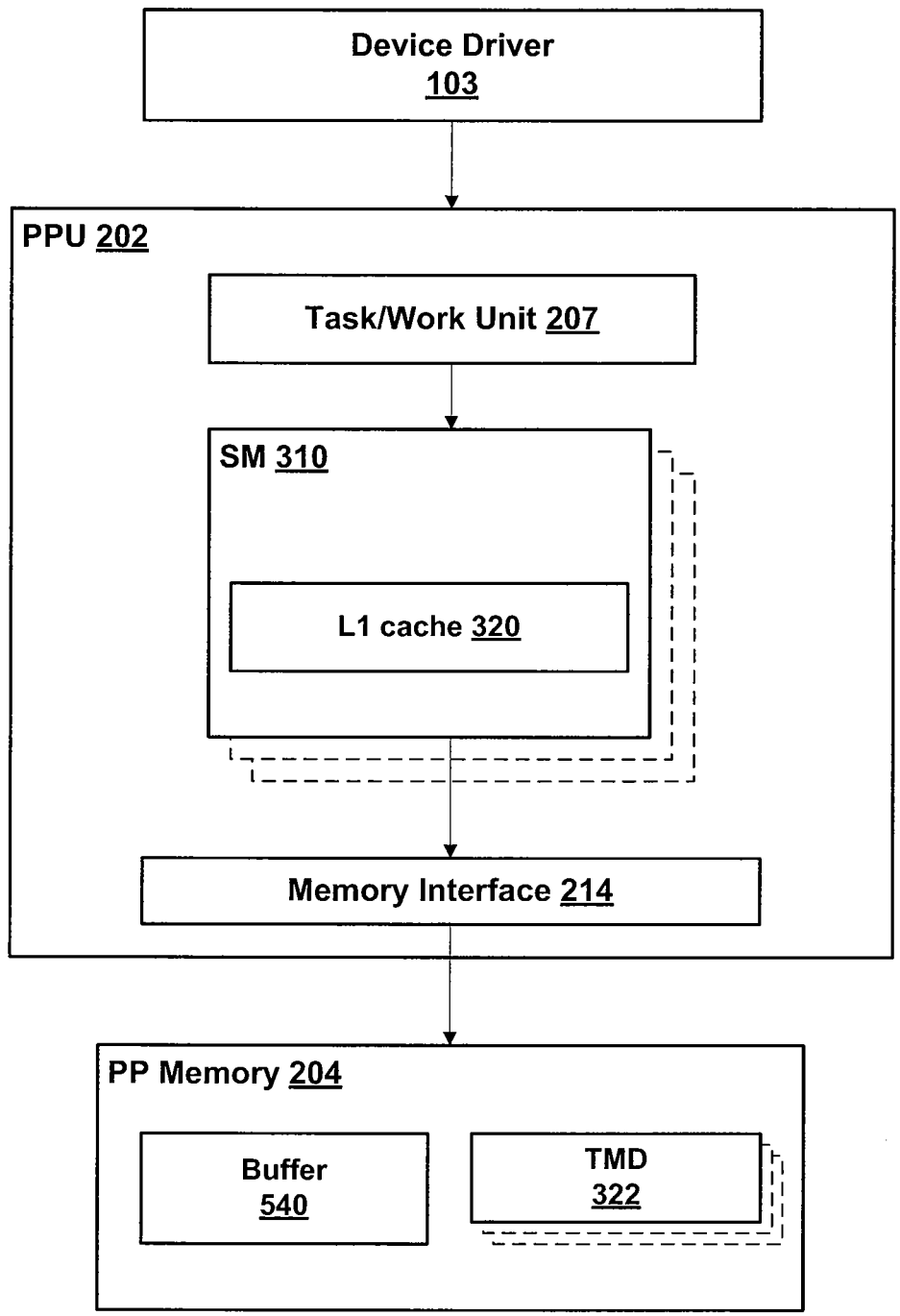
FIG. 5B is a block diagram of the components of system 100 configured to allocate shader local memory for compute tasks, according to one example embodiment of the present disclosure.

FIG. 5B is a block diagram of the components of system 100 configured to allocate shader local memory for compute tasks, according to one example embodiment of the present disclosure. As discussed above, device driver 103 allocates memory in a virtual address space 510 to each active SM 310. The physical memory locations that correspond to the virtual memory addresses are located in a buffer 540 within PP memory 204. LSUs 303 may address the virtual memory addresses in shader local memory directly via L1 cache 320. In the event of a cache miss, a memory page will be fetched from PP memory 204 to the L1 cache 320 via memory interface 214. As task/work unit 207 receives task pointers to TMDs 322 in PP memory 204 to schedule on the SMs 310, task management unit 300 selects a subset of tasks to run concurrently on the SMs 310 and transmits the subset of tasks to the work distribution unit 340 to issue to the SMs 310. As discussed above, the work distribution unit 340 keeps a task table 345 with a number of slots for each task currently scheduled on each SM 310.

Each TMD 322 may require a vastly varying amount of resources depending on the particular programs (i.e., thread groups or warps) stored in the CTAs associated with the TMD 322. One TMD 322 may include a warp that requires very little shader local memory per thread. Another TMD 322 may include a warp that requires a large amount of shader local memory per thread. In conventional memory allocation techniques, each SM 310 is allocated a fixed portion of the total available memory in the virtual address space 510. If a warp that requires very little memory is scheduled on a first SM, the shader local memory associated with the first SM will go largely unused. In contrast, if a warp that requires a lot of memory is scheduled on a second SM, the shader local memory associated with the second SM may not be enough, even though there is a vast amount of unused shader local memory associated with the other SMs 310. One solution to this problem is that the device driver 103 could track how much memory was needed by specific tasks transmitted to PPU 202 and reallocate the shader local memory to provide more memory to each thread by using a smaller number of active SMs 310. By turning some of the SMs 310 "off", the amount of shader local memory available to each of the active SMs 310 increases. While such techniques may be relatively efficient when tasks are executed in the same order as when they are transmitted to the PPU 202, in some instances, PPU 202 may be configured to execute tasks out of order from when they were received from device driver 103. Device driver 103 may not have be able to control the order of execution of tasks or even have access to determine which tasks are currently scheduled on active SMs 310. Therefore, different techniques are disclosed herein that enable automatic reconfiguration of PPU 202 based on discrete throttling modes specified within the TMD 322.

Auto-Throttling Encapsulated Compute Tasks

Again, each CTA within a TMD 322 includes up to m thread groups or warps and each warp includes up to k concurrently executing threads. TMD 322 also includes a maximum shader local memory requirement per thread associated with the TMD 322. The maximum amount of shader local memory needed per warp for a particular TMD 322 is given by Equation 1.

$$SLM\_per\_warp = (k * TMD.ShaderLocalMemoryHighSize) +$$

$$(k * TMD.ShaderLocalMemoryLowSize) + TMD.ShaderLocalMemoryCrsSize; \quad \text{(Eq. 1)}$$

Each SM 310 can support up to G warps concurrently, so the minimum shader local memory that must be allocated to each active SM 310 is given by Equation 2.

$$SLM\_per\_SM = G * SLM\_per\_warp; \quad \text{(Eq. 2)}$$

In one embodiment, each warp includes up to 32 concurrently executing threads and each SM can support up to 64 warps executing concurrently. Using the worst case per thread memory requirements that may be specified in the TMD 322 (i.e., 512 kB for shader local memory high, 512 kB for shader local memory low, and 1 MB for call return stack), the maximum size of the required shader local memory to be allocated per warp is approximately 33 MB and the maximum size of the required shader local memory per SM 310 is over 2 GB. As these numbers make clear, even with only one active SM 310, the amount of memory allocated for shader local memory for even one SM 310 is extremely large and multiple SMs 310 compound this issue. Furthermore, if the worst case shader local memory size is allocated to each thread, much of the allocated memory will never be utilized because some of the warps executing on the SM 310 will only use a small fraction of the memory required by the most memory intensive warp.

Figure 6:
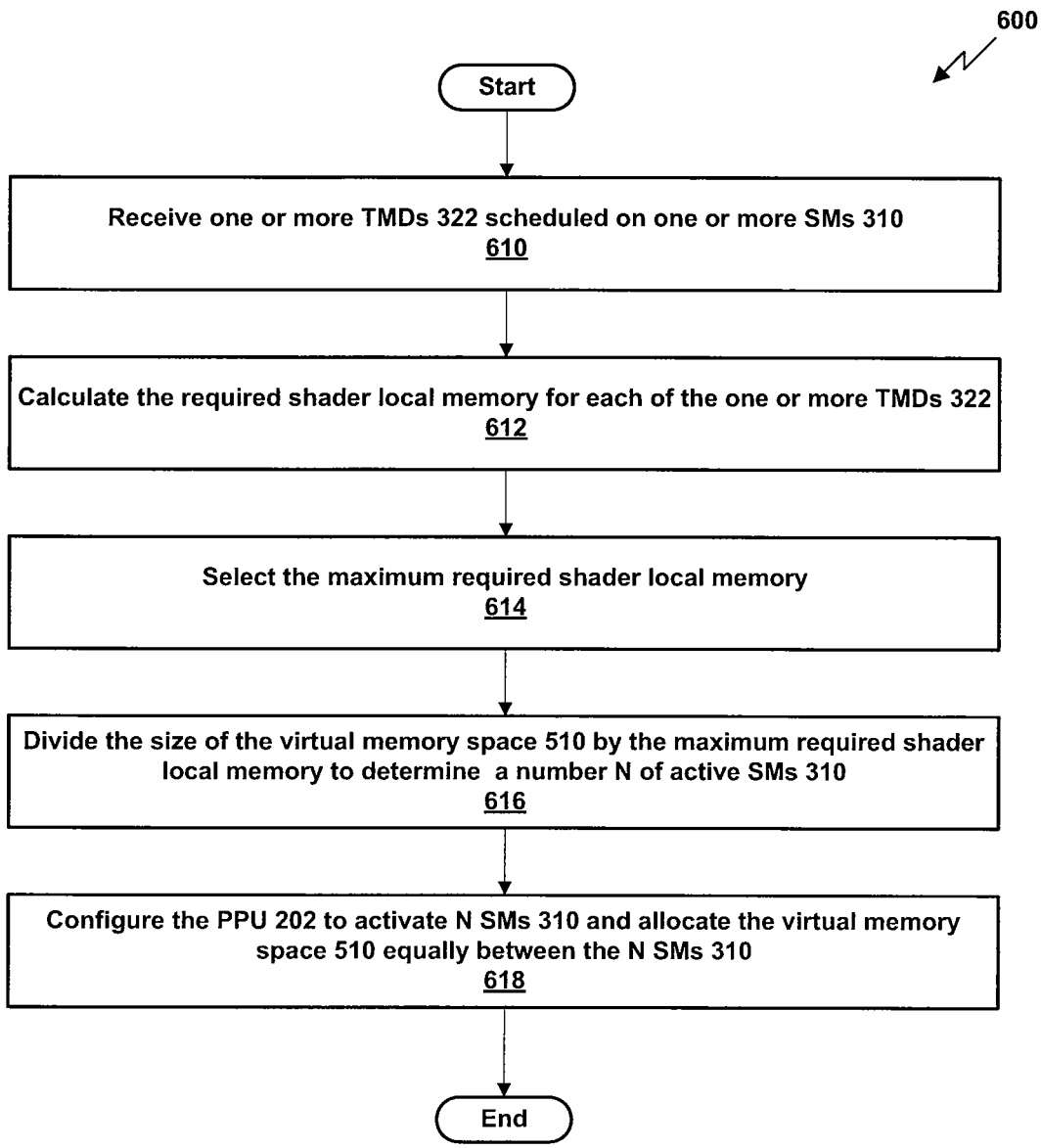
FIG. 6 illustrates a method 600 for dynamically allocating shader local memory, according to one example embodiment of the present disclosure.

FIG. 6 illustrates a method 600 for dynamically allocating shader local memory, according to one example embodiment of the present disclosure. Although the method steps are described in conjunction with the systems of FIGS. 1-5, persons of ordinary skill in the art will understand that any system configured to perform the method steps, in any order, is within the scope of the disclosure.

Method 600 begins at step 610, where work distribution unit 340 receives one or more task pointers for TMDs 322 to schedule on the SMs 310 of PPU 202. As described above, work distribution unit 340 includes a task table 345 that includes slots for each task scheduled on each of the SMs 310. At step 612, work distribution unit 340 calculates the required shader local memory for each of the TMDs 322 in the task table 345. In one embodiment, the work distribution unit 340 calculates a shader local memory required per SM according to Equation 2, set forth above. At step 614, the work distribution unit 340 selects the maximum required shader local memory from all of the TMDs 322 within the task table 345. At step 616, work distribution unit 340 divides the size of the virtual address space 510 by the maximum required shader local memory calculated in step 614 in order to determine a number N of SMs 310 that may be activated such that allocation of the virtual address space 510 among the N active SMs 310 allows for more than the maximum required shader local memory per thread. At step 618, work distribution unit 340 configures PPU 202 to use N active SMs 310 and allocates the virtual address space 510 equally between the N SMs 310.

The dynamic allocation of memory described by method 600 is complex and requires a dedicated hardware unit constantly monitoring the TMDs in task table 345 and updating the active number of SMs 310. As each TMD 322 is transmitted from device driver 103 to task/work unit 207 and scheduled on one of the SMs 310, work distribution unit 340 selects the maximum required shader local memory for all currently scheduled TMDs 322 and determines whether the active number of SMs 310 corresponds to an allocated shader local memory size that is larger than the maximum required shader local memory. If the active number of SMs 310 should be reconfigured to change the memory allocation, then work distribution unit 340 causes the SMs 310 to idle in order to change the configuration of PPU 202. If the size of TMDs 322 changes frequently, then PPU 202 may be forced to idle many times in order to constantly update the active number of SMs 310. Furthermore, determining the number of active SMs 310 requires a divide operation, which is expensive in hardware. Thus, a simpler solution is described below.

In one embodiment, device driver 103 is configured to set a flag bit in TMD 322 that determines whether the TMD 322 is executed by PPU 202 in a throttled mode. PPU 202 may be configured to run in one of two modes, throttled or non-throttled. In non-throttled mode, the number of active SMs 310 is determined based on the size of the available shader local memory. For example, PPU 202 may be coupled to a PP memory 204 that provides 1 GB of DDR DRAM memory for graphics processing. PP memory 204 may include a 256 MB buffer 540 allocated for shader local memory. In a non-throttled mode, each SM 310 may be allocated 16 MB of shader local memory, allowing for up to 16 SMs 310 to be active in the non-throttled mode. However, as discussed above, some threads may require more shader local memory when executing. Thus, a throttled mode is also defined where PPU 202 is configured to use a subset of the SMs 310 that are active during the non-throttled mode. PPU 202 will idle all of the SMs 310 currently executing compute tasks, deactivate a portion of the SMs 310, reallocate the shader local memory according to the smaller number of active SMs 310, and schedule compute tasks for execution on the active SMs 310. By reallocating the shader local memory based on a smaller number of SMs 310, each thread is allocated more memory. For example, the throttled mode may utilize 4 active SMs 310, resulting in 64 MB per SM 310 of allocated shader local memory instead of the 16 MB per SM 310 allocated in the non-throttled mode.

In one embodiment, device driver 103 sets a flag bit (TMD.Throttled) in the execution parameters 415 of TMD 322 that specifies whether the warps in TMD 322 should be run in a throttled mode or a non-throttled mode. Device driver 103 may compare the required shader local memory per warp to a threshold value. If the size of the required shader local memory is below the threshold value, then device driver 103 clears the flag bit in TMD 322 to indicate that the warps associated with TMD 322 may be executed in either throttled mode or non-throttled mode. It will be appreciated that any warps executed in the non-throttled mode may also be executed in throttled mode because the shader local memory requirement is satisfied in both cases. However, if the size of the required shader local memory is above the threshold value, then device driver 103 will set the flag bit in TMD 322 to indicate that the warps associated with TMD 322 may only be executed in throttled mode.

As TMDs 322 are scheduled to execute on the active SMs 310, the task pointers to the TMDs 322 are added to task table 345. Work distribution unit 340 is configured to OR all of the flag bits for each TMD 322 in task table 345 to determine whether any currently scheduled tasks require PPU 202 to be configured in the throttled mode. If the PPU 202 is running in non-throttled mode and one or more TMDs 322 in task table 345 include a set flag bit, then work distribution unit 340 causes all SMs 310 to idle (i.e., finish execution of the current warps and store any state information necessary to continue running the task on a different SM 310) and reconfigures PPU 202 to run in the throttled mode. Correspondingly, if a task completes execution while PPU 202 is in throttled mode and the TMD 322 associated with the task is evicted from the task table 345 such that work distribution unit 340 determines that there are no currently scheduled tasks that are required to be run in throttled mode, then work distribution unit 340 may reconfigure PPU 202 to run in the non-throttled mode.

In other embodiments, PPU 202 may be configured with multiple discrete levels of throttling. For example, in a non-throttled mode, PPU 202 may include up to 16 active SMs 310. In a first throttled mode, PPU 202 may include up to 12 active SMs 310. In a second throttled mode, PPU 202 may include up to 8 active SMs 310. In a third throttled mode, PPU 202 may include up to 4 active SMs 310. In such embodiments, device driver 103 may specify a certain mode for the task using a multi-bit flag (i.e., 2 bits for four discrete levels of throttling). Work distribution unit 340 may then determine which level of throttling is appropriate for the worst case shader local memory requirement for the scheduled tasks. For example, work distribution unit 340 may find the maximum of all multi-bit flags (e.g., where 00 corresponds to the non-throttled mode, 01 corresponds to the first throttled mode, 10 corresponds to the second throttled mode, and 11 corresponds to the third throttled mode) and then configure PPU 202 accordingly based on the maximum value of the multi-bit flags.

One advantage of using discrete levels of throttling (i.e., different preconfigured numbers of active SMs) is that the shader local memory may be pre-allocated based on the number of active SMs 310 in the non-throttled mode and the number of active SMs 310 in the throttled mode. Memory addresses into shader local memory are calculated using an SM identification index and a warp identification index. Therefore, changing the active number of SMs 310 results in a new factor multiplied by these index numbers when calculating a base address for a particular thread into shader local memory. Thus, device driver 103 may allocate shader local memory for each of the throttling modes by simply updating the factors used in address calculation based on the number of active SMs 310 in each throttling mode. Similarly, work distribution unit 340 may reconfigure PPU 202 between non-throttled mode and throttled mode by re-scheduling tasks on the active SMs 310 and calculating addresses within the tasks based on the different factors. The factors may be stored in special registers and configured by device driver 103 before execution of tasks are commenced.

Figure 7:
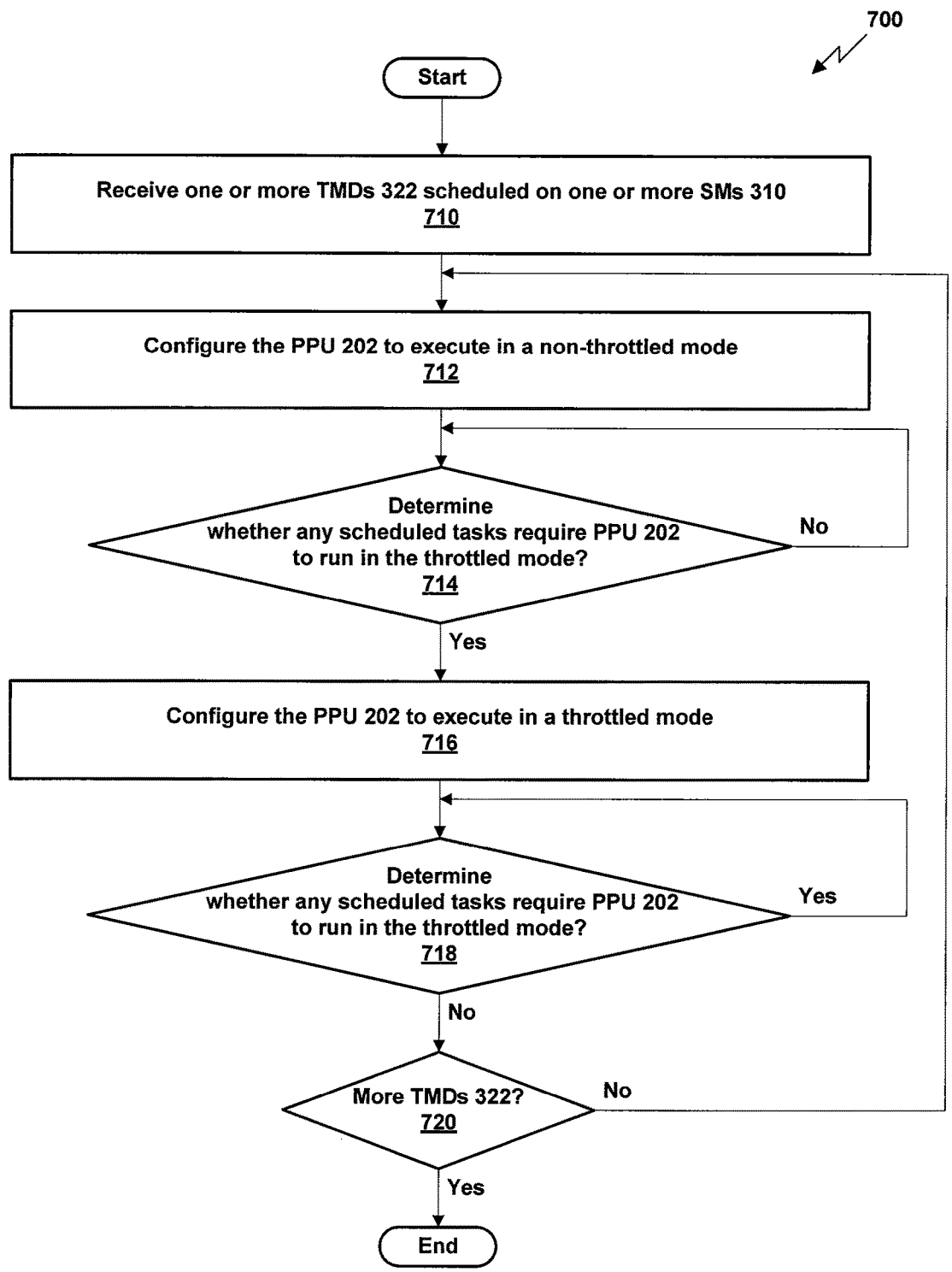
FIG. 7 illustrates a method for dynamically allocating shader local memory, according to another example embodiment of the present disclosure.

FIG. 7 illustrates a method 700 for dynamically allocating shader local memory, according to another example embodiment of the present disclosure. Although the method steps are described in conjunction with the systems of FIGS. 1-5, persons of ordinary skill in the art will understand that any system configured to perform the method steps, in any order, is within the scope of the disclosure.

Method 700 begins at step 710, where work distribution unit 340 receives one or more task pointers for TMDs 322 to schedule on the SMs 310 of PPU 202. As described above, work distribution unit 340 includes a task table 345 that includes slots for each task scheduled on each of the SMs 310. At step 712, work distribution unit 340 configures PPU 202 to operate in a non-throttled mode. At step 714, work distribution unit 340 determines whether any scheduled tasks require PPU 202 to be run in a throttled mode. In one embodiment, each TMD 322 includes a flag bit that specifies whether the TMD 322 requires PPU 202 to run in throttled mode. In this embodiment, work distribution unit 340 performs an OR operation with all of the flag bits of the TMDs 322 in the task table 345 to determine whether any of the TMDs 322 in task table 345 require execution in a throttled mode of PPU 202. In other embodiments, each TMD 322 includes a multi-bit flag that specifies one of three or more discrete levels of throttling. In such embodiments, work distribution unit 340 compares each of the multi-bit flags to find a maximum multi-bit flag that specifies the maximum amount of throttling (i.e., the minimum number of active SMs 310) required to run the tasks of that TMD 322.

If none of the scheduled tasks require the PPU 202 to be run in throttled mode, then method 700 returns to step 710 and waits for additional tasks to be scheduled for execution. However, if one or more tasks require PPU 202 to be run in the throttled mode, then method 700 proceeds to step 716 where work distribution unit 340 configures PPU 202 to run in a throttled mode. In one embodiment, work distribution unit 340 causes each of the SMs 310 to idle any currently executing compute tasks. Once all SMs 310 are idle, work distribution unit 340 reconfigures PPU 202 to use a smaller number of active SMs 310 and redistributes the scheduled tasks to the smaller number of SMs 310. In other embodiments, work distribution unit 340 may reconfigure PPU 202 to run in one of two or more discrete throttling modes.

At step 718, similar to step 714, work distribution unit 340 determines whether any scheduled tasks require PPU 202 to be run in a throttled mode. If at least one task requires PPU 202 to be run in the throttled mode, then method 700 waits at step 718 until all tasks with a set flag bit have completed execution and been evicted from the task table 345. However, if none of the tasks require PPU 202 to be run in throttled mode, then at step 720, work distribution unit 340 determines whether there are any pending tasks in task table 345. If there is at least one pending task, then method 700 returns to step 712 where work distribution unit 340 reconfigures PPU 202 to run in the non-throttled mode. However, if there are no pending tasks in task table 345, then method 700 terminates.

In sum, a processing unit is configured for operation in two or more throttling modes. In a non-throttled mode, compute tasks may be executed by any of the active modules within the processing unit. In a throttled mode, compute tasks may be executed by a smaller subset of modules within the processing unit, thereby allowing a fixed shader local memory to be allocated among fewer active threads. The device driver may predetermine whether the threads associated with a compute task have a large shader local memory requirement and, if so, set a flag in the associated data structure indicating to the processing unit that the threads associated with that task should be executed in the throttled mode.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

What is claimed is:

1. A method for auto-throttling encapsulated compute tasks, the method comprising:
receiving one or more tasks to be scheduled for execution by a processor that includes a plurality of parallel processing units, wherein the processor may be configured in a non-throttled mode in which a first number of the plurality of parallel processing units are active for processing tasks or a throttled mode in which a second number of the plurality of parallel processing units are active for processing tasks, the second number being smaller than the first number;
determining that at least one of the tasks scheduled for execution includes a throttled flag, wherein the throttled flag indicates that the corresponding task is to be executed only when the processor is configured in the throttled mode; and
in response to determining that the at least one of the tasks scheduled for execution includes the throttled flag, configuring the processor to activate the second number of parallel processing units.

2. The method of claim 1, wherein the processor comprises a graphics processing unit (GPU) that includes a work distribution unit coupled to the plurality of parallel processing units and that schedules tasks for execution on the plurality of parallel processing units.

3. The method of claim 2, wherein determining whether at least one of the tasks scheduled for execution may be executed only when the processor is configured in the throttled mode comprises:
storing the tasks scheduled for execution in a task table; and
performing an OR operation using a throttled flag associated with each task stored in the task table.

4. The method of claim 3, wherein each task in the one or more tasks comprises a data structure stored in a memory that includes a field that represents the throttled flag.

5. The method of claim 4, wherein the field comprises a single bit that is set to indicate that the task may be executed only when the processor is configured in the throttled mode or cleared to indicate that the task may be executed in either the throttled mode or the non-throttled mode.

6. The method of claim 4, wherein the field comprises a multi-bit value that corresponds to three or more discrete throttling states, the multi-bit value indicating in which discrete throttling state the task may be executed, and wherein each discrete throttling state corresponds to a different number of active parallel processing units.

7. The method of claim 1, further comprising:
if the processor is configured in the non-throttled mode, then associating each of the activated parallel processing units with a first range of virtual memory addresses, wherein each parallel processing unit is associated with a unique index and each thread that executes on a particular parallel processing unit is associated with a unique thread index; or
if the processor is configured in the throttled mode, then associating each of the activated parallel processing units with a second range of virtual memory addresses, wherein the second range of virtual memory addresses is larger than the first range of virtual memory addresses for each of the parallel processing units activated in the throttled mode.

8. The method of claim 7, wherein a device driver allocates a buffer in a memory coupled to the processor to provide a private local memory for each of the threads executing on the parallel processing units, and wherein a memory mapping unit in the processor translates virtual memory addresses into locations within the buffer.

9. The method of claim 8, wherein each task is associated with a throttled flag, and wherein the device driver, upon determining that a size of local memory required by a particular task is above a threshold value, sets the throttled flag associated with the particular task.

10. A processor for auto-throttling encapsulated compute tasks, the processor comprising:
a plurality of parallel processing units, wherein the processor may be configured in a non-throttled mode in which a first number of the plurality of parallel processing units are active for processing tasks or a throttled mode in which a second number of the plurality of parallel processing units are active for processing tasks, the second number being smaller than the first number; and
a work distribution unit coupled to the plurality of parallel processing units, wherein the work distribution unit:
receives one or more tasks to be scheduled for execution,
determines that at least one of the tasks scheduled for execution includes a throttled flag, wherein the throttled flag indicates that the corresponding task is to be executed only when the processor is configured in the throttled mode, and
in response to determining that the at least one of the tasks scheduled for execution includes the throttled flag, configures the processor to activate the second number of parallel processing units.

11. The processor of claim 10, wherein the processor comprises a graphics processing unit (GPU).

12. The processor of claim 11, wherein determining whether at least one of the tasks scheduled for execution may be executed only when the processor is configured in the throttled mode comprises:
storing the tasks scheduled for execution in a task table; and
performing an OR operation using a throttled flag associated with each task stored in the task table.

13. The processor of claim 12, wherein each task in the one or more tasks comprises a data structure stored in a memory that includes a field that represents the throttled flag.

14. The processor of claim 13, wherein the field comprises a single bit that is set to indicate that the task may be executed only when the processor is configured in the throttled mode or cleared to indicate that the task may be executed in either the throttled mode or the non-throttled mode.

15. The processor of claim 13, wherein the field comprises a multi-bit value that corresponds to three or more discrete throttling states, the multi-bit value indicating in which discrete throttling state the task may be executed, and wherein each discrete throttling state corresponds to a different number of active parallel processing units.

16. The processor of claim 10, wherein a device driver:
associates each of the parallel processing units activated in the non-throttled mode with a first range of virtual memory addresses, wherein each parallel processing unit is associated with a unique index and each thread that executes on a particular parallel processing unit is associated with a unique thread index; or
associates each of the parallel processing units activated in the throttled mode with a second range of virtual memory addresses,
wherein the second range of virtual memory addresses is larger than the first range of virtual memory addresses for each of the parallel processing units activated in the throttled mode.

17. The processor of claim 16, wherein the device driver allocates a buffer in a memory coupled to the processor to provide a private local memory for each of the threads executing on the parallel processing units, and wherein a memory mapping unit in the processor translates virtual memory addresses into locations within the buffer.

18. The processor of claim 17, wherein each task is associated with a throttled flag, and wherein the device driver, upon determining that a size of local memory required by a particular task is above a threshold value, sets the throttled flag associated with the particular task.

19. The processor of claim 10, wherein configuring the processor to activate the second number of parallel processing units comprises idling the first number of parallel processing units, and then deactivating a portion of the first number of parallel processing units.

20. The processor of claim 19, wherein configuring the processor to activate the second number of parallel processing units further comprises, after deactivating the portion of the first number of parallel processing units, allocating memory resources to the second number of parallel processing units.

21. A system for auto-throttling encapsulated compute tasks, the system comprising:
a memory; and
a processor coupled to the memory and including a plurality of parallel processing units, the processor:
receives one or more tasks to be scheduled for execution by the processor, wherein the processor may be configured in a non-throttled mode in which a first number of the plurality of parallel processing units are active for processing tasks and a throttled mode in which a second number of the plurality of parallel processing units are active for processing tasks, the second number being smaller than the first number,
determines that at least one of the tasks scheduled for execution includes a throttled flag, wherein the throttled flag indicates that the corresponding task is to be executed only when the processor is configured in the throttled mode, and
in response to determining that the at least one of the tasks scheduled for execution includes the throttled flag, configures the processor to activate the second number of parallel processing units.

22. The system of claim 21, wherein the processor comprises a graphics processing unit (GPU) that includes a work distribution unit coupled to the plurality of parallel processing units and that schedules tasks for execution on the plurality of parallel processing units.

* * * * *